Oct. 6, 1931.          G. GIANOLIO          1,825,902
ROLLING PARALLEL RULER
Filed Dec. 1, 1928
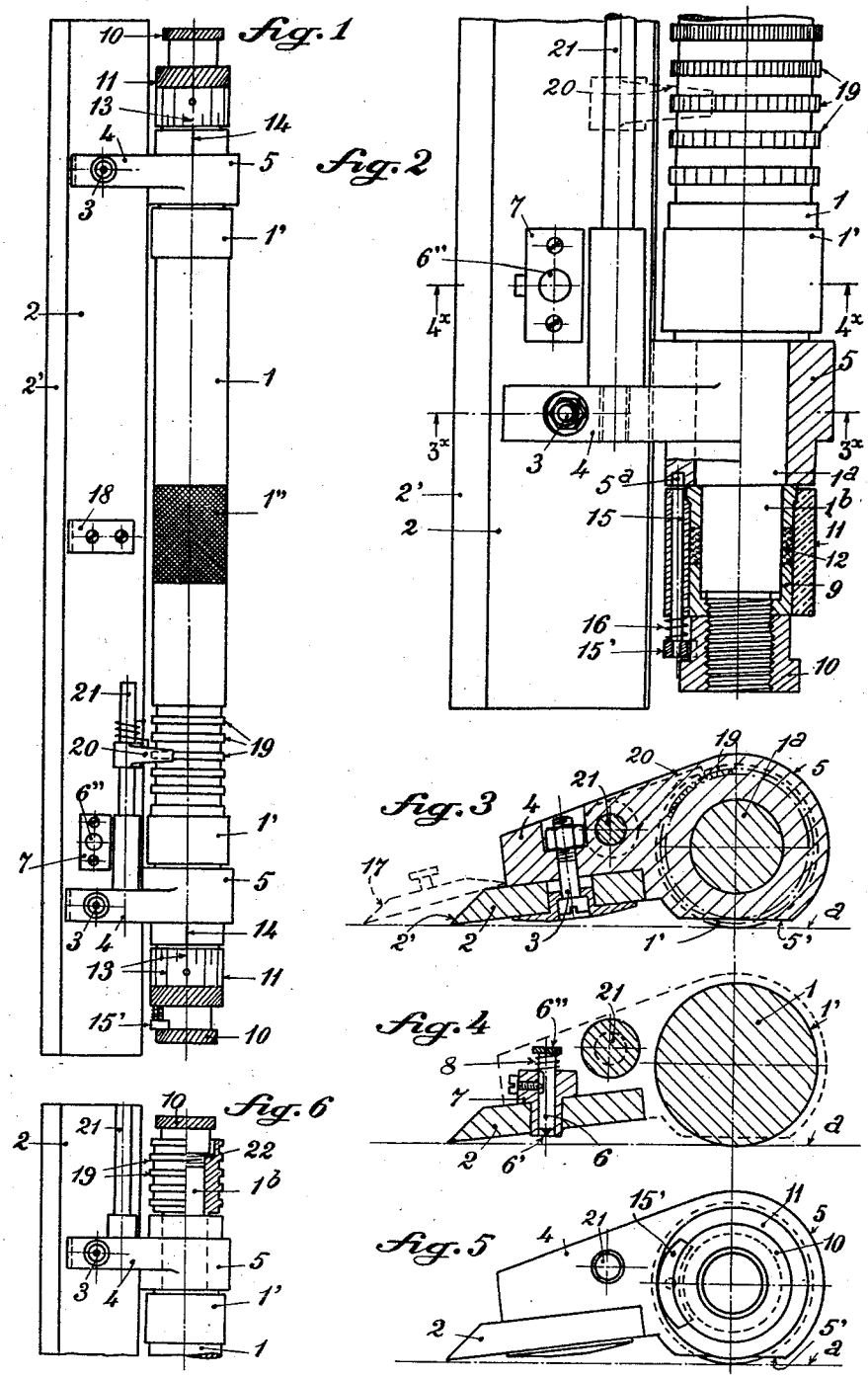
Inventor
Giuseppe Gianolio,
by Henry Orth Jr. Atty Patented Oct. 6, 1931

1,825,902

UNITED STATES PATENT OFFICE

GIUSEPPE GIANOLIO, OF TURIN, ITALY

ROLLING PARALLEL RULER

Application filed December 1, 1928, Serial No. 323,062, and in Italy August 6, 1928.

Object of the present invention is a "drawing apparatus" characterized substantially by a rule, preferably graduated, disposed transversely sloping toward the plane of the drawing on which it lies with its thin edge only, and so mounted as to be shifted parallel to itself by means of a guide roll, very heavy, lying on the plane of the drawing, on which it may be made to turn without slipping. To the said roll the rule is secured parallel to the roll axis and is supported by means of the arms protruding radially from collars mounted free to turn over suitably located journals of the roll with the small friction so as to insure a continuous contact of the rule edge with the plane of the drawing whatever the direction of the rotation might be.

A form of execution of the object of the invention is shown only by way of example, in the annexed drawings, in which: Fig. 1 represents the top view of the ensemble of the apparatus, Fig. 2 represents in a larger scale an end of the apparatus also in plan and partially sectioned, Figs. 3 and 4 are its transverse sections along the lines $3x$—$3x$ and $4x$—$4x$ of Fig. 2; Fig. 5 is an end view; Fig. 6 shows a modification.

The apparatus substantially involves a roll 1 and a rule 2 mounted parallel to the roll by which it is carried.

The roll is preferably made of metal in order to make it rather heavy. It is preferably made hollow and weighted with lead. The roll is intended to lie on the plane —a— of the drawing with its two cylindrical portions 1' (bearing surfaces), identical and of a diameter greater than the other portions of the roll, and situated towards the ends. The bearing surfaces 1' of the roll are preferably roughened so as to adhere well to the plane of the drawing and consequently to revolve over it without slipping when the roll is made to turn under the thrust of the hand of the operator applied to its intermediate part, whose diameter differs very little from the diameter of the bearing surfaces 1' in order not to lessen the weight. The said intermediate part is preferably knurled as at 1'' to which the hand of the operator will be applied. The diameter of the bearing surfaces 1' is preferably so selected as to make their circumference equal to a multiple of a chosen unit of length. Thus, if the roll revolves over the plane of the drawing by exactly a single turn, the ensemble of the roll and of the rule will be shifted parallel to itself by the said multiple of the chosen unit.

The rule 2 is of any kind, preferably with a graduated edge 2'. The rule is adjusted parallel to the axis of the roll 1 fastening it by means of the screws 3 to at least two arms 4 protruding radially from the collars 5 through which the said arms are mounted free to turn with the least friction on the journals —$1^a$— provided at suitable points of the roll 1. The rule 2, because of its weight and of that of the arms 4, will bear continually on the plane —a— of the drawing. The seats on the arms 4 for the application of the rule are so designed as to have the rule transversely sloping towards the said plane on which it will therefore lie with its graduated thin edge 2' only. The collars 5 of the arms 4 are preferably of a diameter greater than that of the bearing surfaces 1' of the roll in order to protect these in case of a fall of the apparatus. The lower part of said collars 5 is cut off, as at 5', Figs. 3 and 5, in a plane parallel to the plane of the drawing in order to allow the free contact between the plane of the drawing and the bearing surfaces 1'.

The rule 2 carries (Figs. 2 and 4), enclosed and guided vertically by a bush 7 fastened to it, a punch 6 normally raised by a spring 8 so that its point 6' keeps clear from the plane —a— of the drawing but may be brought to bear against it by pressing the head 6'' of the punch, for the purpose to be specified later.

The roll 1, beyond the journals —$1^a$— provided for the collars 5 of the arms 4, is furnished with the journals $1^b$, on one at least of said journals is fastened (Fig. 2) a bush 9 screwed to the threaded extremity of —$1^b$— on which also the bottom 10 acting as a lock nut is screwed. On the bush 9, coaxial with the roll, is mounted turnable with moderate friction a ring 11 which, for that reason, normally rotates with the roll 1, but which may also be made to revolve independently from it or to be kept still while the roll revolves. The necessary friction between the ring 11 and the bush 9 is obtained, for example, by means of a friction material 12, as of cork, located inside suitable holes of the bush 9. The said ring 11, which is adjacent to the corresponding collar 5, carries a graduation 13 numbered both ways starting from the zero, which may be read by a fixed lens, not shown, opposite to the index 14 marked on the adjacent collar 5; a vernier might be substituted for the more simple index 14.

Through the ring, parallel to the roll axis, a hole is drilled in which a pin 15 may be made to slide by applying pressure, in opposition to that exercised by the spring 16, on its head 15'; the adjacent collar 5 is provided with a recess —5ª— into which the end of the pin may be urged for keeping the ring from turning. The position of the recess —5ª— is so chosen that, when the end of the pin 15 is driven into it, the zero of the graduation 13 of the ring is opposite to the index 14 of the adjacent collar.

If, as above stated, the diameter of the bearing surfaces 1' of the roll is so chosen that the circumference of the said surfaces is a multiple of a given length unit, the graduations 13 of the ring should contain a number of divisions equal to said multiple; each division will correspond to the unit chosen and will in turn contain a number of subdivisions as usual. The amount of the shift, parallel to itself, of the edge of the rule 2 due to the revolving of the roll 1, will be indicated on the graduations 13 by the index 14, which will not take part in the rotation of the roll because it is fixed to the collar 5 but which could oscillate about the axis of the roll were the plane —a— of the drawing not perfectly true; said eventual oscillations will not in this case be of any import if the edge of the roll lies on the plane at a substantial distance from the axis of the roll.

In the form of invention represented in Fig. 1 the roll is supposedly provided with two graduated rings 11, one at each end; this may be useful in practice but it is not absolutely necessary because a single ring might do.

The handling of the apparatus and its functioning is as follows: With the apparatus on the drawing with the edge of the rule 2 along a given direction, if the roll 1 is made to revolve forward or backward, the rule will shift parallel to itself and lines may be drawn parallel to the direction given. To draw a line parallel to a given line and at a given distance from the same, the apparatus is moved so as to make the edge of the rule 2 to coincide with the line already drawn, the zero of the graduated ring 11 is then made to face the index by turning the ring 11 on its bush 9 till the pin 15 enters into the recess —5ª—, the pin head 15' is released and the roll is revolved until the given distance is indicated on ring 11; the line wanted is then drawn along the edge of the rule. To draw perpendicular lines a common square laid against and run along the edge of the rule 2 may be used; if however it is considered that, while the roll 1 is revolving, any point of the rule will describe a line perpendicular to the rule edge, to indicate a perpendicular line one may mark the successive positions of a suitable point of the rule. Particularly the punch 6, brought to bear against the plane of the drawing for two positions however distant reached by the apparatus as a consequence of the revolving of its roll 1, will indicate, by means of the marks impressed on the plane of the drawing by the point 6', a line perpendicular to the direction of the rule.

In order to indicate segments of a given length one may make use of the graduation on the edge of the rule 2 or of the graduation of a double or triple decimeter 17 laid against the ends of the arms 4, as shown in Fig. 3, or against a rest 18 (Fig. 1) fixed to the rule and set in line with the ends of the said arms.

The apparatus is furnished preferably with a means to facilitate hatching and therefore the regular shift step by step of the rule with the possibility of varying the step. Said means (Figs. 1 and 2) includes a number of collars 19 produced in the body of the roll by cutting circular grooves at a suitable distance: the collars 19 are provided on their periphery with equidistant notches and each collar carries a different number of notches; a pawl 20, mounted movable along an axle 21 parallel to the roll and fixed for example to one of the arms 4, may be brought into contact with any of the collars 19 with the help of elastic means. Then, while the roll is revolved by hand, the snapping of the pawl into the successive notches will indicate clearly the shifting step by step of the rule, and will therefore facilitate the drawing of equidistant successive parallel lines as in hatching.

The collars 19 instead of being machined out of the body of the roll may also be machined in a separate sleeve 22 which will be secured to the end of the roll, by way of example, by substituting it to one of the graduated rings 11 and its relative bushing 9, as indicated in the modification shown in Fig. 6.

Of course the present invention is not at all restricted to the dispositions shown and explained, but without getting far away from its principle, can undergo all the modifications that the circumstances and the practical needs might suggest as necessary or useful within the scope of the subjoined claims.

I claim:

1. A drawing apparatus comprising a roll having an enlarged bearing surface near each end, journals on the roll, collars mounted on said journals, arms on said collars and a rule secured to the arms inclined to the supporting surface of the apparatus for edge contact with said surface and said collars being external of and of larger diameter than the roll bearing surfaces for protecting said rollers from injury and cut away at their bottom to a distance less than the diameter of the bearing surfaces.

2. A drawing apparatus comprising a roll having near each end a bearing surface of enlarged diameter, journals near each end of the roll, a collar mounted on each journal and having a cutaway portion, arms on said collars, a rule secured to the arms and held in inclined position for edge contact with a drafting surface, the ends of said arms being alined back of said edge and parallel thereto for positioning of an auxiliary ruler, a bush on the end of the roller, a graduated ring on the bush, a spring-retracted pin carried by the graduated ring, a nut on the threaded end of the roller to fasten securely the bush to the roller and to provide with its portion machined of larger diameter a stop for keeping the pin in place.

3. A drawing apparatus comprising a roll having near each end a bearing surface of enlarged diameter, journals near each end of the roll, collars mounted on said journals and arms on said collars, a rule secured to the arms inclined for edge contact with the drafting surface, there being an index fixed to the collar, a ring frictionally mounted on an end of the roller and graduated in opposite directions from zero in relation to the circumference of the bearing surfaces which is a multiple of a given unit of length, means to latch said ring in zero position, said means comprising a pin carried by the graduated ring together with its crescent like head and spring, and a recess (5a) machined in the collar.

In testimony that I claim the foregoing as my invention, I have signed my name.

GIUSEPPE GIANOLIO.